Jan. 17, 1939.    M. N. HALBERG    2,144,531
MOTOR CONTROL SYSTEM
Filed April 20, 1934

Inventor:
Maynord N. Halberg,
by Harry E. Dunham
His Attorney.

Patented Jan. 17, 1939

2,144,531

UNITED STATES PATENT OFFICE 2,144,531

MOTOR CONTROL SYSTEM

Maynord N. Halberg, Schenectady, N. Y., assignor to General Electric Company, a corporation of New York Application April 20, 1934, Serial No. 721,481

10 Claims. (Cl. 171—118)

My invention relates to motor control systems and particularly to systems for controlling the application of the direct current excitation to a synchronous motor field winding.

One object of my invention is to provide an improved arrangement of apparatus for connecting a synchronous motor field winding to a source of excitation so that the motor pulls into step upon the application of the direct current excitation to the field winding and without any substantial surges occurring in the motor armature current due to the motor slipping one or more poles during the synchronizing operation.

In certain synchronous motor installations the load connected to the motor is of such size and character that the motor can develop sufficient pull-in torque to pull itself into step in response to the application of direct current to its field winding only when the direct current is applied at just the right part of the slip cycle of induced field current. This particular part of the slip cycle depends upon the characteristics of the motor. Also the operating time of the field switching means has to be taken into consideration in determining when the operation of the switching means should be initiated in order to effect the connection of the source of direct current excitation at the proper time.

In accordance with my invention I provide an arrangement which operates in response to a predetermined frequency of the induced field current when the motor is operating below synchronous speed to initiate at a predetermined point on the slip cycle of the induced field current the operation of suitable timing means which, after it has been in operation for a predetermined definite time, effects the operation of suitable switching means for connecting the source of excitation to the motor field winding. The definite time which it takes the timing means to operate is so predetermined that the operation of the field switching means is initiated to effect the connection of the source of excitation to the motor field winding at the most favorable point in the slip cycle of induced field current for synchronizing.

Figure 1:
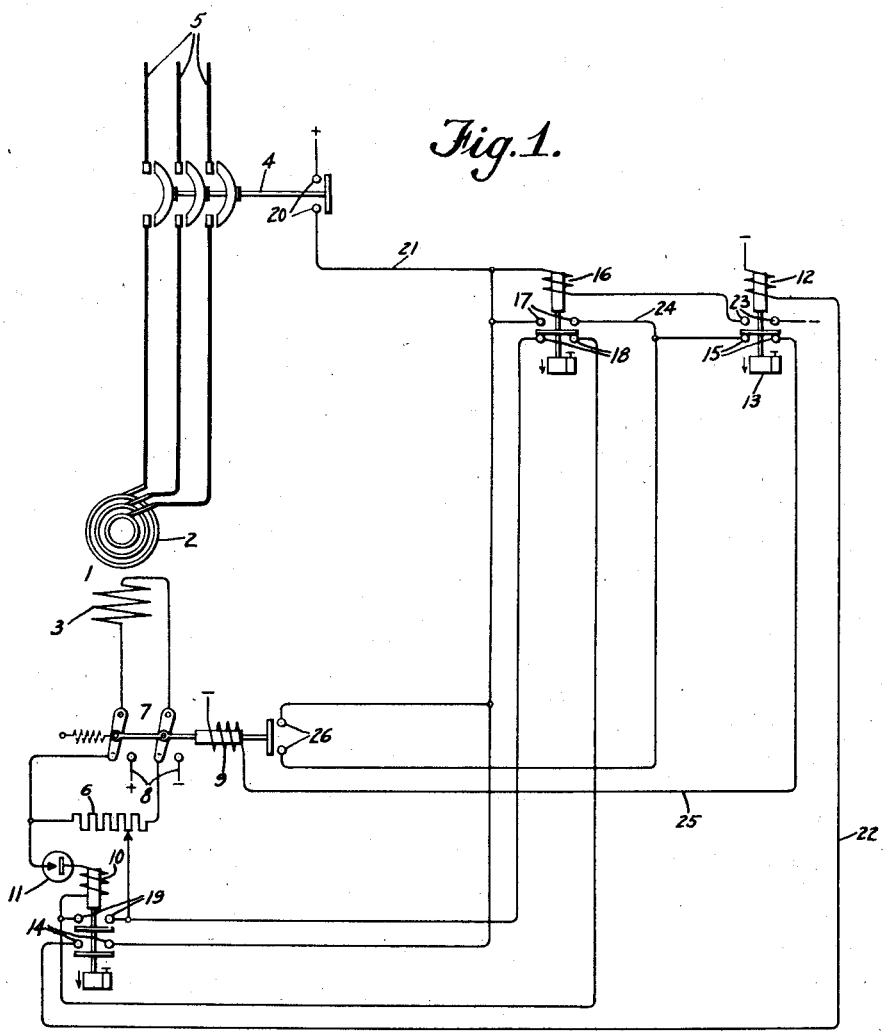
Figure 2:
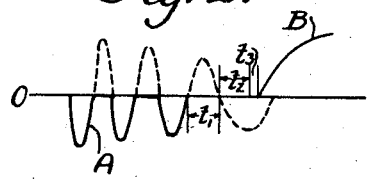

My invention will be better understood from the following description when taken in connection with the accompanying drawing, Fig. 1 of which diagrammatically shows a synchronous motor starting system embodying my invention and Fig. 2 of which shows explanatory curves, and its scope will be pointed out in the appended claims.

Referring to Fig. 1 of the drawing, 1 represents a synchronous motor which is provided with an armature winding 2 and a field winding 3.

In order to simplify the disclosure, I have shown my invention in connection with a full voltage starting arrangement for a synchronous motor so that it is started by connecting the armature winding 2, by means of a suitable manually controlled switch 4, directly across an alternating current supply circuit 5 while the field winding 3 is short-circuited through a discharge resistor 6. Therefore, normal supply circuit voltage is supplied to the motor armature winding to start the motor as an induction motor. In practice the motor also will usually have a squirrel cage winding, which is not shown. While I have shown a full voltage starting equipment, it will be understood that any other well-known synchronous motor starting equipment may be employed to start the motor from rest and accelerate it up to approximately synchronous speed.

The connection of the field winding 3 to the discharge resistor 6 is completed by means of two-position field switch 7 when it is in the position shown in the drawing. When the switch 7 is in its other position, the discharge resistor 6 is disconnected from the field winding 3 and field winding 3 is connected to a suitable source of excitation 8. Switch 7 is provided with an operating winding 9 which, when energized, moves the switch 7 from the position in which it is shown to its other position in which the source of excitation 8 is connected to the field winding 3.

In accordance with my invention, I control the energization of the operating winding 9 of the switch 7 so that it is energized at that part of the slip cycle of induced field current which will produce the most favorable synchronizing operation. In order to accomplish this result, I employ the field application relay arrangement disclosed in United States Letters Patent 1,958,250, granted May 8, 1934, and assigned to the same assignee as this application, and I have this relay initiate the operation of suitable timing means which, after being in operation for a definite length of time, completes an energizing circuit for the operating winding 9. This field application relay arrangement preferably consists of a time relay 10 and a half wave rectifier 11 connected in series across a portion or all of the discharge resistor 6. With such an arrangement, the induced current which flows through the motor field winding 3, while the motor 1 is operating below synchronous speed, causes the relay 10 to pick up and remain in its picked up position until the motor reaches a predetermined subsynchronous speed at which time the frequency of the induced current becomes so low that the half cycle during which substantially no current flows through the relay winding is just long enough to allow the relay to return to its normal position at the end of that half cycle of slip frequency current. By having this relay 10 initiate the operation of a suitable timing means which has a predetermined definite time of operation and by having the timing means at the end of its definite time operation complete an energizing circuit for the operating winding 9 of the switch 7, the direct current excitation is always applied to the field winding 3 at exactly the same point on the slip cycle of induced field current. Furthermore by properly setting the operating time of the timing means the excitation is always applied at the most favorable synchronizing point of the slip cycle of induced field current.

In the arrangement shown the timing means is a definite time relay 12 which immediately picks up when its winding is energized and which does not return to its normally deenergized position until a predetermined definite time has elapsed after the winding thereof is deenergized. This predetermined definite time may be obtained in any suitable manner and as shown in the drawing is obtained by means of an adjustable dashpot 13 connected to the movable element of the relay. The circuit of the time relay 12 is arranged to be completed when the contacts 14 of the relay 10 are closed and to be deenergized when these contacts are open. The relay 12, in turn, is provided with contacts 15 which are connected in the circuit of the operating winding 9 of the switch 7 and which are closed a predetermined definite time interval after the relay 10 opens its contacts 14.

In order to insure that the field switch 7 is not closed until after the relay 12 has been energized in response to the closing of the contacts 14 of relay 10, I provide the relay 16 which has its contacts 17 connected in series with the contacts 15 of relay 12 and the operating winding of switch 7. The circuit of relay 16 is controlled by the relay 12 so that it cannot be energized to close its contacts 17 until after the relay 12 has been energized. The relay 16 is designed in any suitable manner so that it immediately closes its contacts 17 when the winding of the relay is energized but when the winding is deenergized it does not open its contacts 17 until after a predetermined time has elapsed.

The relay 16, when in its normally deenergized position, also has its normally closed contacts 18 connected in series with the winding of relay 10 so that this relay can pick up only when relay 16 is in its normally deenergized position. By closing its contacts 19, the relay 10 completes a locking circuit for its winding which is independent of the contacts 18 of relay 16 so that after the relay 10 once picks up it remains picked up independently of the contacts 18 of relay 16.

The operation of the arrangement shown in Fig. 1 of the drawing is as follows: When it is desired to start the motor, the switch 4 is closed so that the full voltage of the circuit 5 is applied to the armature winding 2 to start the motor 1 from rest and accelerate it to approximately synchronous speed. As soon as the motor armature winding 2 is energized, a voltage of slip frequency is induced in the motor field winding 3 and this voltage causes a current of slip frequency to flow through the field winding 3 and the discharge resistor 6 and a pulsating current to flow through the rectifier 11 and the winding of relay 10. In Fig. 2 curve A illustrates the induced current of slip frequency which flows through the field winding 3 as the motor approaches synchronous speed, the solid portions representing the half-waves of current during which current flows through the rectifier 11 and winding of relay 10. Until the motor reaches substantially synchronous speed, the magnitude and periodicity of the rectified current through the winding of relay 10 are such that the relay picks up and maintains its contacts 14 and 19 closed. As soon as the contacts 14 close, a circuit is completed for the operating winding of the relay 12. This circuit is from one side of a suitable control circuit through auxiliary contacts 20 on the circuit breaker 4, conductor 21, contacts 14 of relay 10, conductor 22, winding of relay 12 to the other side of the control circuit. By closing its contacts 23, relay 12 completes through the conductor 21 and the auxiliary contacts 20 on circuit breaker 4 an energizing circuit for the operating winding of relay 16. By the time the relay 16 opens its contacts 18, the relay 10, by closing its contacts 19, has already completed a shunt circuit around the contacts 18 so that the relay 10 remains energized after the contacts 18 are open.

When the motor reaches substantially synchronous speed, the frequency of the induced current in the field winding 3 and the resistor 6 becomes so low that the time interval of each half cycle during which substantially no current flows through the winding of relay 10 is just long enough to allow the relay to return to its normal position at a time when the induced field current is approximately zero. his time interval is shown as $t_1$ in Fig. 2. By opening its contacts 19, the relay 10 interrupts the locking circuit for itself so that it remains deenergized although the value of the next half wave of induced field current, which is in the proper direction to flow through the rectifier and which is shown dotted to the right of $t_1$ in Fig. 2 may be sufficient to pick up the relay, because at this time the contacts 18 in the original energizing circuit of the relay 10 are open. By opening its contacts 14, the relay 10 interrupts the above traced circuit for the operating coil of relay 12. A predetermined definite time, shown as $t_2$ in Fig. 2, after the contacts 14 open, the relay 12 opens its contacts 23 and closes its contacts 15, thereby effecting the deenergization of relay 16 and the completion of a circuit for the operating winding 9 of the switch 7. This circuit for winding 9 is from one side of the control circuit through auxiliary contacts 20 on switch 4, conductor 21, contacts 17 of relay 16, conductor 24, contacts 15 of relay 12, conductor 25, operating winding 9 of field switch 7 to the other side of the control circuit. By closing its auxiliary contacts 26, the switch 7 completes a locking circuit for its operating winding which is independent of the contacts 17 of the time relay 16, which open after the relay 16 has been deenergized for a predetermined time.

Due to the operating time of field switch 7, a relatively short time interval, shown as $t_3$ in Fig. 2, elapses between the closing of contacts 15 and the closing of field switch 7. When the switch 7 closes, direct current starts to build up, as shown by curve B in Fig. 2, in the field winding 3 and the motor pulls into synchronism and thereafter operates at synchronous speed.

Since the relay 10 always closes its contacts at substantially the same point on the slip cycle of induced field current and the operating times of the relay 12 and the field switch 7 are constant it will be seen that by means of my arrangement I am able to apply the direct current at that point in the slip cycle of induced field current which is most favorable for synchronizing.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In a motor control system, an alternating current circuit, a synchronous motor having an armature winding connected to said circuit and a field winding, a source of excitation for said field winding, and means for connecting said source to the motor field winding at the point in the slip cycle of induced current in the field winding most favorable for synchronizing including timing means having a definite time of operation, means responsive to the frequency of the induced current in the motor field winding for initiating the operation of said timing means at a predetermined point on the slip cycle of induced field current, and means responsive to the operation of said timing means for connecting said source to the motor field winding.

2. In a motor control system, an alternating current circuit, a synchronous motor having an armature winding connected to said circuit and a field winding, a source of excitation for said field winding, and means for connecting said source to the motor field winding at the point in the slip cycle of induced current in the field winding most favorable for synchronizing including a rectifier, a definite time relay having a winding connected in series relation with said rectifier and field winding, timing means having a definite time of operation, means controlled by said relay for initiating the definite time operation of said timing means at the end of a half cycle of induced field current of predetermined frequency during which no current flows through said rectifier, and means responsive to the definite time operation of said timing means for connecting said source to the motor field winding.

3. In a motor control system, an alternating current circuit, a synchronous motor having an armature winding connected to said circuit and a field winding, a source of excitation for said field winding, and means for connecting said source to the motor field winding at the point in the slip cycle of induced current in the field winding most favorable for synchronizing including timing means having a definite time of operation, means for initiating the definite time operation of said timing means at the end of a half cycle of induced field current of predetermined frequency, and means responsive to the definite time operation of said timing means for connecting said source to the motor field winding.

4. In a motor control system, an alternating current circuit, a synchronous motor having an armature winding connected to said circuit and a field winding, a source of excitation for said field winding, a field switch for connecting said source to said field winding, a time relay for initiating after being in operation for a predetermined definite time the closing of said field switch, and means for initiating the operation of said time relay at the end of a half cycle of induced field current of predetermined frequency flowing in a predetermined direction.

5. In a motor control system, an alternating current circuit, a synchronous motor having an armature winding connected to said circuit and a field winding, a source of excitation for said field winding, a field switch for connecting said source to the motor field winding, said switch having an operating winding, and means for completing an energizing circuit for said operating winding including a set of normally closed contacts in said energizing circuit, a set of normally open contacts in said energizing circuit, and means including a half-wave rectifier and a relay having a winding in series with said rectifier and field winding for effecting the opening of said normally closed contacts when the frequency of the induced field current exceeds a predetermined value and for closing said set of normally closed contacts after a predetermined definite time interval when the time duration of the slip cycle of induced field current during which no current flows through said rectifier exceeds a predetermined value and for effecting the closing of said set of normally open contacts after said set of normally closed contacts are opened and for maintaining them closed for a predetermined time after said normally closed contacts are subsequently closed.

6. In a motor control system, an alternating current circuit, a synchronous motor having an armature winding connected to said circuit and a field winding, a source of excitation for said field winding, a field switch for connecting said source to the motor field winding, said switch having an operating winding, a half wave rectifier, a relay having a winding in series with said rectifier and field winding, a set of normally closed contacts in series with said relay winding, contacts controlled by said relay for shunting said normally closed contacts when said relay is in its energized position, an energizing circuit for said switch operating winding including a set of normally closed contacts and a set of normally open contacts, and means controlled by said relay for effecting the opening of both of said sets of normally closed contacts when the frequency of the induced field current exceeds a predetermined value and for closing said set of normally closed contacts in said switch operating winding circuit after a predetermined definite time interval when the time duration of the slip cycle of induced field current during which no current flows through said rectifier exceeds a predetermined value and for effecting the closing of said set of normally open contacts after said set of normally closed contacts in said energizing circuit are opened and for maintaining them closed after said set of normally closed contacts are subsequently closed.

7. In a motor control system, an alternating current circuit, a synchronous motor having an armature connected to said circuit and a field winding, a source of excitation for said field winding, and means for connecting said source to the motor field winding at the point in the slip cycle of induced current in the field winding most favorable for synchronizing including timing means having a definite time of operation, means including a rectifier for initiating the operation of said timing means at a predetermined point in the slip cycle, and means responsive to the operation of the definite timing means for connecting said source to the motor field winding.

8. In combination, an alternating current circuit, a synchronous machine having an armature winding connected to said circuit and a field winding, a source of excitation for said field winding, and means for connecting said source to said field winding at a predetermined optimum point on the wave of induced field current including timing means having a definite time of operation, means dependent upon the frequency of the induced field current for initiating the operation of said timing means at a definite point on the wave of induced field current when the motor speed increases to a predetermined value, and means responsive to said timing means completing its timing operation for connecting said source to said field winding.

9. In combination, an alternating current circuit, a synchronous machine having an armature winding connected to said circuit and a field winding, a source of excitation for said field winding, and means for connecting said source to said field winding at a predetermined optimum point on the wave of induced field current including timing means having a definite time of operation, means responsive to an electrical condition of the field circuit indicative that the speed of said machine is a predetermined value for initiating the operation of said timing means at a definite point on the wave of induced field current, and means responsive to said timing means completing its timing operation for connecting said source to said field winding.

10. In combination, an alternating current circuit, a synchronous machine having an armature winding connected to said circuit and a field winding, a source of excitation for said field winding, and means for connecting said source to said field winding at a predetermined optimum point on the wave of induced field current including timing means having a definite time of operation, means responsive to an electrical condition of said machine indicative that the speed of said machine is a predetermined value for initiating the operation of said timing means at a definite point on the wave of induced field current, and means responsive to said timing means completing its timing operation for connecting said source to said field winding.

MAYNORD N. HALBERG.